United States Patent [19]
Saito

[11] Patent Number: 6,138,807
[45] Date of Patent: Oct. 31, 2000

[54] SEPARATOR PLATE FOR A MULTI-PLATE TYPE FRICTIONAL ENGAGEMENT APPARATUS

[75] Inventor: Shinichi Saito, Fukuroi, Japan

[73] Assignee: NSK-Warner K.K., Tokyo, Japan

[21] Appl. No.: 09/288,621

[22] Filed: Apr. 9, 1999

[30] Foreign Application Priority Data

Apr. 14, 1998 [JP] Japan .................................. 10-102583

[51] Int. Cl.$^7$ ............................ F16D 13/52; F16D 13/64; F16D 69/02
[52] U.S. Cl. .................................... 192/70.14; 192/107 M
[58] Field of Search ............................ 192/70.14, 107 M

[56] References Cited

U.S. PATENT DOCUMENTS 5,029,686   7/1991   Yesnik ................................... 192/70.14
5,048,654   9/1991   Yesnik ................................... 192/70.14

OTHER PUBLICATIONS

Okamoto, Shozo, *Steel Materials,* Corona Co., Ltd., 1968, Section 5.4 "Recovery and Recrystallization", pp. 49–53.

*Primary Examiner*—Rodney H. Bonck
*Attorney, Agent, or Firm*—Vorys, Sater, Seymour and Pease LLP

[57] ABSTRACT

In order to suppress the creation of a heat spot and extend the service life of an apparatus, a separator plate disposed between frictional plates is formed of a steel material in which microstructure is ferrite and pearlite structure and ferrite crystal grain size numbers are Nos. 9 and 10.

12 Claims, 2 Drawing Sheets

SEPARATOR PLATE FOR A MULTI-PLATE TYPE FRICTIONAL ENGAGEMENT APPARATUS

BACKGROUND OF THE INVENTION

1. Field of the Invention

This invention relates to a multi-plate type frictional engagement apparatus for changing over the transmission and non-transmission of motive power in the automatic transmission of a vehicle. More particularly, it relates to improvements in a separator plate used in the multi-plate type frictional engagement apparatus.

2. Related Background Art

Generally, a multi-plate type frictional engagement apparatus for changing over the transmission and non-transmission of motive power in the automatic transmission of a vehicle such as an automobile has a plurality of frictional plates and a plurality of separator plates disposed among them. During the non-transmission of the motive power, the frictional plates and the separator plates are spaced apart from each other with a predetermined clearance therebetween, but during the transmission of the motive power, the frictional plates and the separator plates assume a fastened state in which they are in contact with each other under pressure.

When shift is made from the fastened state to a non-fastened state and from the non-fastened state to the fastened state, and sometimes even in the fastened state, the frictional plates and the separator plates are in a relationship in which they fictionally slide relative to each other. Thus, during the operation of the frictional engagement apparatus, the frictional plates and the separator plates are exposed to a high temperature by frictional heat.

Heretofore, the separator plate has been made by working a thermally rolled material of ferrite crystal grain size number 12 or higher by cold rolling at a draft of the order of 50 to 60% and therefore, has become fibrous structure worked to such a degree that the grain diameter of the crystal thereof cannot be confirmed. Thereby, depending on a severe condition of use, with the frictional heat created by the frictional contact of the separator plate with the frictional plate as the main cause, the separator plate is recrystallized, quenched and tempered, and a minute protuberance or projection, i.e., a so-called "heat spot" is sometimes formed on the surface of the separator plate. If this protuberant heat spot is formed, when the frictional plate and the separator plate fictionally slide relative to each other, the heat spot attaches a frictional material attached to the frictional plate and may damage the frictional material. This has resulted in the problem that the service life of the apparatus becomes shorter.

Also, from the present day energy and environmental problems, the frictional engagement apparatus is required to be compact and light in weight and be high in durability, particularly durability against heat. From this point also, it is desired to supress the creation of the heat spot.

SUMMARY OF THE INVENTION

Accordingly, it is an object of the present invention to provide a frictional engagement apparatus and a separator plate in which the creation of a heat spot is suppressed and the life of which can be extended.

To achieve the above object, a first feature of the present invention is that in a separator plate for a multi-plate type frictional engagement apparatus having a plurality of frictional plates and used in an automatic transmission, and disposed between said frictional plates, said separator plate is formed of a steel material in which microstructure is ferrite and pearlite structure and ferrite crystal grain size numbers are Nos. 9 and 10.

Also, a second feature of the present invention is that in a multi-plate type frictional engagement apparatus having a plurality of frictional plates and a separator plate disposed between said frictional plates, and used in an automatic transmission, said separator plate is formed of a steel material in which microstructure is ferrite and pearlite structure and ferrite crystal grain size numbers are Nos. 9 and 10.

The microstructure is ferrite and pearlite structure, and ferrite crystal grain size numbers are Nos. 9 and 10, and this is subjected to cold rolling at a slight draft, i.e., about 20 to 40% to thereby keep necessary hardness, and the recrystallization by frictional heat can be suppressed. As a result, the creation of a heat spot is suppressed.

DESCRIPTION OF THE PREFERRED EMBODIMENTS

Figure 1:
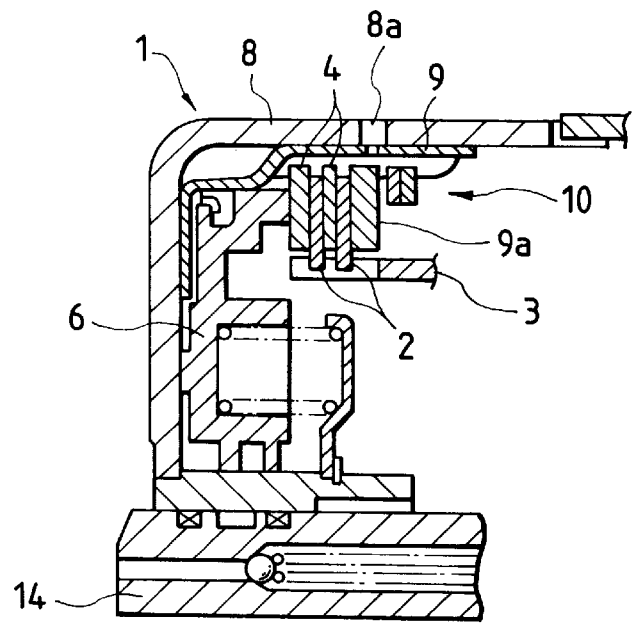
FIG. 1 is a fragmentary cross-sectional view of a multi-plate type frictional engagement apparatus incorporating therein a separator plate according to the present invention.

Some preferred embodiments of the present invention will hereinafter be described in detail with reference to the accompanying drawings. Throughout the drawings, the same portions are designated by the same reference numerals.

FIG. 1 is a fragmentary cross-sectional view of a multi-plate type frictional engagement apparatus 10 in which a separator plate according to the present invention is incorporated. The multi-plate type frictional engagement apparatus has a plurality of frictional plates 2 and separator plates 4. The multi-plate type frictional engagement apparatus comprises a clutch drum 1 rotatably supported on a shaft cylinder portion 14 fixed to a transmission case 83 (see FIG. 3), and a clutch hub 3 fixed to another clutch drum, not shown. The clutch drum 1 further has an outer drum 8 and an inner drum 9 incorporated in the inner peripheral surface of the outer drum 8 as by spot welding. In the case of FIG. 1, the inner drum 9 is fixed to the outer drum 8 by spot welding. Frictional plates 2 serving as clutch plates and comprising, for example a wet type frictional material stuck on steel plates are supported on the outer periphery of the clutch hub 3. Also, the separator plates 4 disposed between the frictional plates 2 and movable toward and away from the frictional plates 2 are supported by the inner drum of the clutch drum 1. Those surfaces of the frictional plates on which a frictional material is stuck and the surfaces of the separator plate 4 which are steel plates are alternately mounted so as to face each other. The reference character 8a designates an oil supply hole for supplying lubricating oil therethrough. The frictional plate 2 may be supported by the inner drum 9, and the separator plates 4 may be supported by the clutch hub 3.

When in such a construction, a piston 6 presses the frictional plates 2 and the separator plates 4, the frictional plates 2 and the separator plates 4 are sandwiched between the piston 6 and a restraining member 9a fixed to the inner drum 9 and frictionally slide.

Figure 2:
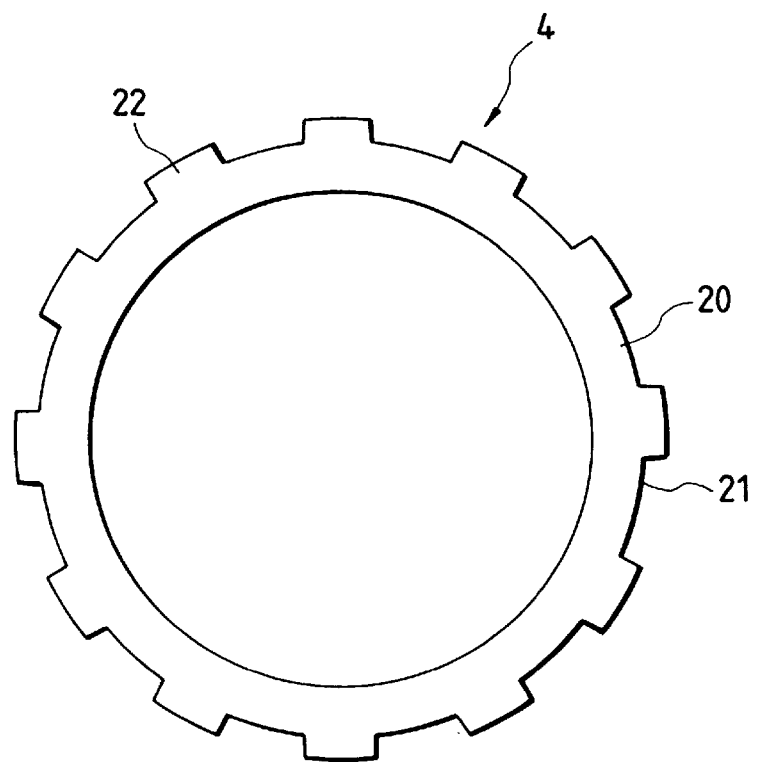
FIG. 2 is a front view of the separator plate according to the present invention.

FIG. 2 is a front view of the separator plate 4 which is an embodiment of the present invention. The separator plate 4 is substantially of the same shape as the frictional plate 2. The separator plate 4 is formed of a steel plate or the like by punching and is annular as a whole. It has an annular portion 21 having an annular frictionally sliding surface 20 frictionally sliding relative to the frictional surface (the surface having a frictional material stuck thereto) of the frictional plate 2 opposed to it. The annular portion 21 is provided with radially outwardly extending projected portions 22 equidistantly in the circumferential direction thereof. The projected portions 22 are engaged with spline grooves provided in the inner periphery of the inner drum 9.

Figure 3:
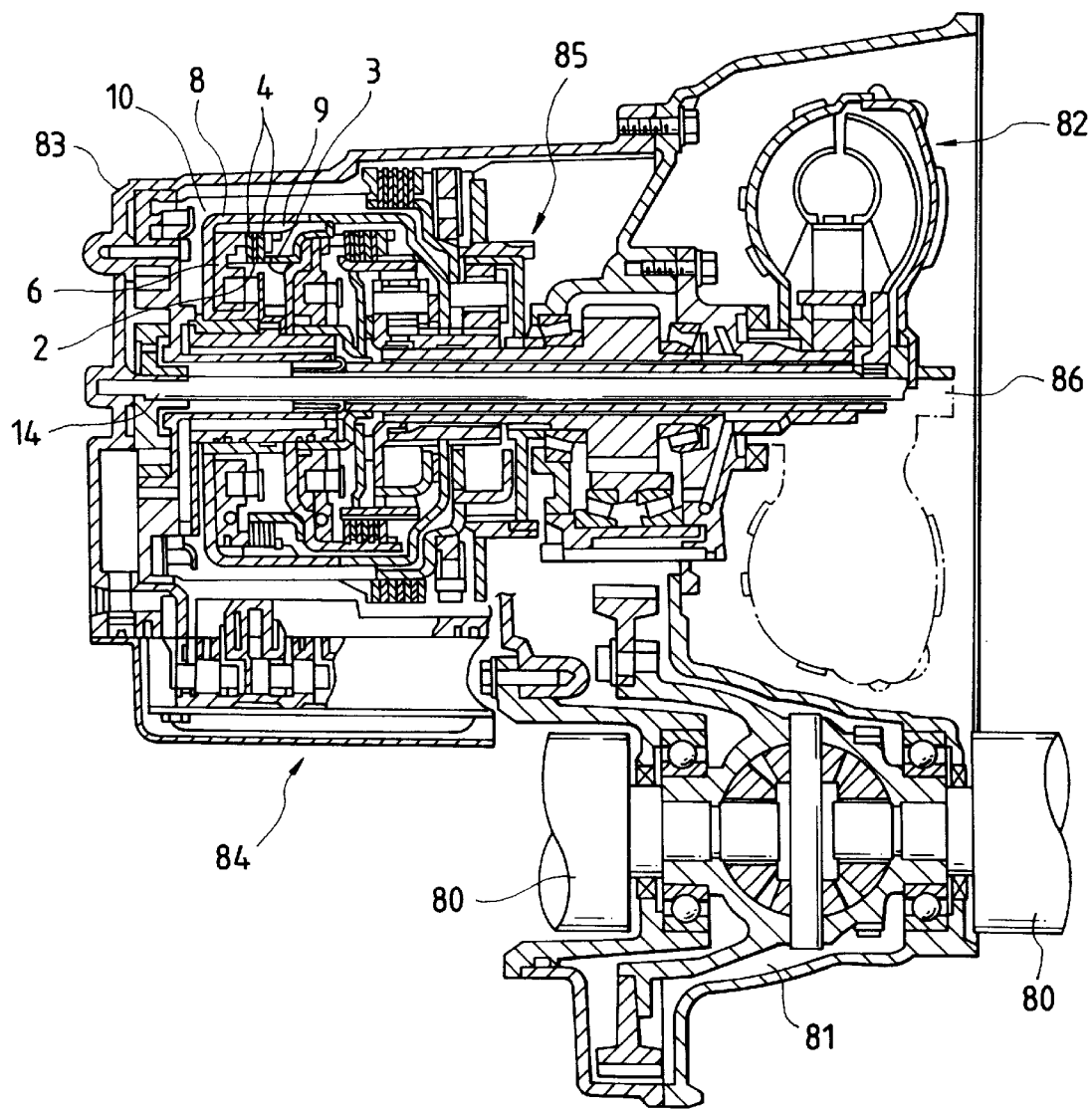
FIG. 3 is a cross-sectional view of an automatic transmission for a front wheel drive vehicle to which the multi-plate type frictional engagement apparatus of the present invention is applied.

FIG. 3 is a cross-sectional view of an automatic transmission for a front wheel drive automobile (FF vehicle) to which the frictional engagement apparatus of the present invention is applied. The motive power from an engine is transmitted to each stage of the transmission through a torque converter 82 and an input shaft 86. The clutch drum 1 is disposed in a transmission case 83. Gears are appropriately selected by a planetary gear mechanism 85, and at that time, the connection and disconnection with a drive system are effected by a multi-plate frictional engagement apparatus, i.e., a multi-plate clutch. A control valve mechanism 84 is provided with the lower portion of the transmission case 83. The motive power from the transmission is transmitted to wheels, not shown, through a differential gear mechanism 81 and an output shaft 80.

The separator plates 4 of the present invention are formed, for example, of a steel plate, and the microstructure of the steel plate used is ferrite and pearlite structure, and the ferrite crystal grain size numbers thereof are Nos. 9 and 10. Also, in the present embodiment, in addition to this, the steel plate is a steel material of which the hardness is Hv 170 to 210 and the carbon percentage content is 0.08 to 0.38%.

When the above-described steel plate is subjected to cold rolling at a slight draft, i.e., about 20 to 40% of desired hardness is obtained. Also, the microstructure of the above-described steel plate makes it difficult for recrystallization to occur and therefore can suppress the recrystallization by frictional heat. As the result, there can be formed a separator plate in which the creation of a heat spot is suppressed.

The "draft" mentioned herein is prescribed as follows when the thickness of a base material (the thickness after hot rolling) is A and the thickness of the product (the thickness after cold rolling) is B:

$$draft(\%) = \{(A)-(B)/(A)\} \times 100$$

Here, with respect to the steel material, crystal grain size, metal structure and hardness, the embodiment of the present invention is compared with an example of the prior art.

Steel Material

In the conventional frictional material, for example, S35CM JIS G 3311 having a relatively high percentage content of carbon is used as the steel material as the base material. In contrast, in the embodiment, carbon steel having a relatively low percentage content of carbon, e.g., 0.08 to 0.38%, is used as the steel material.

Crystal Grain Size

Heretofore, crystal grin size number was 12 or greater, and the crystal was almost fibrous in structure and the grain boundary was unknown. In contrast, in the embodiment, the fibrous structure, when exposed to heat (frictional heat) of 450° or higher, is liable to cause recovery-recrystallization and therefore, the draft was lowered and crystal grain size numbers were selected to Nos. 9 and 10 at which it is difficult for recrystallization to occur. The crystal grain size numbers were measured on the basis of ASTM E112. Also, regarding the recovery-recrystallization, see Steel Materials, written by Shozo Okamoto, published by Corona Co., Ltd., 1968, p.49, "5.4 Recovery and Recrystallization".

Metal Structure

Heretofore, (ferrite and pearlite) structure was held under a transformation point A1 for a predetermined time by annealing and was changed into spheroidized carbide structure (this is because carbide in ferrite is spheroidized and diffused in ferrite). In contrast, in the embodiment, (ferrite and pearlite) structure is maintained. Due to the presence of pearlite which is difficult to harden, the hardness can be made low.

Hardness

Heretofore, the draft was high and the hardness was also high, while on the other hand, recovery-recrystallization was liable to occur. In the embodiment, the hardness and draft are set to low levels to thereby suppress the occurrence of recrystallization.

According to the above-described separator plate for the multi-plate frictional engagement apparatus of the present invention and the multi-plate type frictional engagement apparatus using the same, there is obtained the following effect.

Ferrite and pearlite structure is used and ferrite crystal grain size numbers are selected to Nos. 9 and 10, and as in the embodiment, this is subject to cold rolling at a slight draft, i.e., about 20 to 40%, whereby it is made difficult to cause recrystallization and therefore, the recrystallization by frictional heat can be suppressed. As the result, the creation of a heat spot can be suppressed.

What is claimed is:

1. A separator plate for a multi-plate type frictional engagement apparatus having a plurality of frictional plates and used in an automatic transmission, and disposed between said frictional plates, characterized in that said separator plate is formed of a steel material in which microstructure is ferrite and pearlite structure and ferrite crystal grain size numbers are Nos. 9 and 10.

2. A separator plate according to claim 1, characterized in that said separator plate is formed of a steel material of which the hardness is Hv 170 to 210 and the carbon percentage content is 0.08 to 0.38%.

3. A separator plate according to claim 2, and which has been subjected to cold rolling at a draft of about 20 to 40%.

4. A multi-plate type frictional engagement apparatus having a plurality of frictional plates and a separator plate disposed between said frictional plates, and used in an automatic transmission, characterized in that said separator plate is formed of a steel material in which microstructure is ferrite and pearlite structure and ferrite crystal grain size numbers are Nos. 9 and 10.

5. A multi-plate type frictional engagement apparatus according to claim 4, characterized in that said separator plate is formed of a steel material of which the hardness is Hv 170 to 210 and the carbon percentage content is 0.08 to 0.38%.

6. A multi-plate type frictional engagement apparatus according to claim 5, and which has been subjected to cold rolling at a draft of about 20 to 40%.

7. A separator plate for disposition between a plurality of frictional plates of a multi-plate type frictional engagement apparatus, characterized in that said separator plate is formed of a steel material in which microstructure is ferrite and pearlite structure and ferrite crystal grain size numbers are Nos. 9 and 10.

8. A separator plate according to claim 7, characterized in that said separator plate is formed of a steel material of which the hardness is Hv 170 to 210 and the carbon percentage content is 0.08 to 0.38%.

9. A separator plate according to claim 8, and which has been subjected to cold rolling at a draft of about 20 to 40%.

10. A multi-plate type frictional engagement apparatus having a plurality of frictional plates and a separator plate disposed between said frictional plates, characterized in that said separator plate is formed of a steel material in which microstructure is ferrite and pearlite structure and ferrite crystal grain size numbers are Nos. 9 and 10.

11. A multi-plate type frictional engagement apparatus according to claim 10, characterized in that said separator plate is formed of a steel material of which the hardness is Hv 170 to 210 and the carbon percentage content is 0.08 to 0.38%.

12. A multi-plate type frictional engagement apparatus according to claim 11, and which has been subjected to cold rolling at a draft of about 20 to 40%.

* * * * *